United States Patent
Yoon et al.

(10) Patent No.: US 9,497,037 B2
(45) Date of Patent: Nov. 15, 2016

(54) APPARATUS, METHOD AND SYSTEM FOR PROVIDING EVENT INFORMATION

(75) Inventors: Hyun-sik Yoon, Seoul (KR); Yoon-soo Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 2134 days.

(21) Appl. No.: 11/489,611

(22) Filed: Jul. 20, 2006

(65) Prior Publication Data

US 2007/0018784 A1    Jan. 25, 2007

Related U.S. Application Data

(60) Provisional application No. 60/700,745, filed on Jul. 20, 2005.

(30) Foreign Application Priority Data

Apr. 25, 2006  (KR) .................. 10-2006-0037263

(51) Int. Cl.

| | |
|---|---|
| *G06F 15/173* | (2006.01) |
| *H04L 12/28* | (2006.01) |
| *H04L 12/24* | (2006.01) |
| *H04L 12/26* | (2006.01) |
| *H04L 29/08* | (2006.01) |

(52) U.S. Cl.
CPC ....... *H04L 12/2827* (2013.01); *H04L 41/0677* (2013.01); *H04L 41/0686* (2013.01); *H04L 43/06* (2013.01); *H04L 43/0817* (2013.01); *H04L 67/02* (2013.01); *H04L 67/025* (2013.01); *H04L 12/2803* (2013.01)

(58) Field of Classification Search
CPC .......... H04L 12/2827; H04L 41/0677; H04L 41/0686; H04L 43/06; H04L 43/0817; H04L 67/025
USPC ........................ 709/201, 224, 217
See application file for complete search history.

(56) References Cited

U.S. PATENT DOCUMENTS

| | | |
|---|---|---|
| 6,671,818 B1 | 12/2003 | Mikurak |
| 7,337,402 B2 * | 2/2008 | Milton ............... H04L 29/06 710/8 |

(Continued)

FOREIGN PATENT DOCUMENTS

| | | |
|---|---|---|
| JP | 2000-222247 A | 8/2000 |
| JP | 2002-319972 A | 10/2002 |

(Continued)

OTHER PUBLICATIONS

Office Action dated Jun. 1, 2010 from the Japanese Patent Office in Japanese Patent Application No. 2006-185853.

(Continued)

*Primary Examiner* — Vivek Srivastava
*Assistant Examiner* — Hermon Asres
(74) *Attorney, Agent, or Firm* — Sughrue Mion, PLLC

(57) ABSTRACT

An apparatus, method and system for providing event information are provided. The apparatus includes an event sensing module receiving first event information on an event generated in an event generator in a multicast mode, a control module receiving second event information including detailed information on the generated event using the first event information, and a user interface module providing the second event information to a user.

20 Claims, 7 Drawing Sheets

(56) References Cited

U.S. PATENT DOCUMENTS

| | | | |
|---|---|---|---|
| 7,376,723 B2* | 5/2008 | Cho et al. ............... 709/223 |
| 2002/0078161 A1 | 6/2002 | Cheng | |
| 2002/0080161 A1* | 6/2002 | St. Maurice ........... H04N 7/163 |
| | | | 715/719 |
| 2003/0063608 A1* | 4/2003 | Moonen ............. H04L 12/1836 |
| | | | 370/390 |
| 2003/0217136 A1 | 11/2003 | Cho et al. | |
| 2005/0076150 A1 | 4/2005 | Lee et al. | |
| 2005/0120246 A1 | 6/2005 | Jang et al. | |
| 2007/0112932 A1* | 5/2007 | Min ................... H04L 12/2812 |
| | | | 709/217 |

FOREIGN PATENT DOCUMENTS

| | | |
|---|---|---|
| JP | 2002-366827 A | 12/2002 |
| JP | 2003-092786 A | 3/2003 |
| JP | 2003-141265 A | 5/2003 |
| JP | 2004-062479 A | 2/2004 |
| JP | 2004-112408 A | 4/2004 |
| JP | 2004-118776 A | 4/2004 |
| JP | 2004-118796 A | 4/2004 |
| KR | 20010060869 A | 7/2001 |
| KR | 20040066439 A | 7/2004 |
| KR | 20040079164 A | 9/2004 |
| KR | 20050094247 A | 9/2005 |
| KR | 20050119958 A | 12/2005 |
| KR | 20060003677 A | 1/2006 |

OTHER PUBLICATIONS

Indian Office Action issued Sep. 14, 2011 in corresponding Indian Application No. 1122/MUM/2006.

Communication dated May 12, 2014, issued by the European Patent Office in counterpart European Application No. 06253662.8.

Communication issued Mar. 18, 2016, issued by the European Patent Office in counterpart European Patent Application No. 10185293.7.

* cited by examiner

| TIME | DEVICE IDENTIFICATION INFORMATION (DII) | CONTENT OF EVENT | URL |
|---|---|---|---|
| 2005-11-26 (13:50:10) | DII: 13b35d48-cf08 NAME: SET-TOP BOX | EVENT TYPE: warning SIGNAL STRENGTH: weak | http://10.1.1.1/051126-135010-STBwarning.html |
| 2005-11-26 (14:30:00) | DII: 26c33d22-fa81 NAME: PVR | EVENT TYPE: fault RECORDING ERROR: No space | http://10.1.1.2/051126-143000-PVRError.html |
| 2005-11-26 (16:00:15) | DII: 13b35d48-cf08 NAME:2006 STOCK INFO. | EVENT TYPE: info. STOCK: weekly update | http://192.10.10.50/20051127/StockUpdate.html |

FIG. 7

```
NOTIFY /event/warning HTTP/1.1
HOST: 239.255.250:1901
CONTENT-TYPE: text/xml
CONTENT-LENGTH: 431
NT: upnp:event
NTS: upnp:propchange <?xml version="1.0"?>
<xml>
<e:propertyset xmlns:e="url:schema-upnp-org:event-1-0">
  <e:property>
    <YellowDustXMLData>http://weather.gov/yd.xml</YellowDustXMLData>
  </e:property>
  <e:property>
    <YellowDustHTMLData>http://weather.gov/yd.html</YellowDustHTMLData>
  </e:property>
  <e:property>
    <YellowDustAudioData>http://weather.gov/yd.mp3</YellowDustAudioData>
  </e:property>
</e:propertyset>
</xml>
```

APPARATUS, METHOD AND SYSTEM FOR PROVIDING EVENT INFORMATION

CROSS-REFERENCE TO RELATED APPLICATION

This application claims priority from Korean Patent Application No. 10-2006-0037263 filed on Apr. 25, 2006 in the Korean Intellectual Property Office, and U.S. Provisional Patent Application No. 60/700,745, filed on Jul. 20, 2005 in the United States Patent and Trademark Office, the disclosures of which are incorporated herein by reference in their entirety.

BACKGROUND OF THE INVENTION

1. Field of the Invention

The present invention relates to an apparatus, method and system for providing even information, and more particularly, to an apparatus, method and system for collecting and managing event information generated in devices included in a network forming a predetermined domain such as a home network and providing the event information to a user.

2. Description of the Related Art

With the development of communication and network technology, various types of home networks have been introduced and technology for increasing a user's convenience in controlling and monitoring devices included in a home network has been proposed.

In particular, technology for collecting and providing event information generated in each device to a user, for example, information indicating a status of each device, such as starting recording a program received by a set-top box at a particular time set by a user or terminating the operation of a washing machine, has been proposed so that the user can easily recognize the status of each device.

One representative example of such technology is a home network based on Universal Plug and Play (UPnP) technology. Event information generated in each of devices included in the home network is provided to a user through a procedure illustrated in FIG. 1.

FIG. 1 is a schematic flowchart of the procedure of providing event information using a related art UPnP technology.

In FIG. 1, a "controlling device" changes the status of other devices included in the home network according to a user's input or receives information on a status change from other devices and provides the information to the user. A "controlled device" is controlled by the controlling device and provides information on a generated event to the controlling device through a predetermined procedure. Here, the controlling device and the controlled device are included in one home network.

Referring to FIG. 1, in operation S110, the controlling device requests the controlled device to perform event registration in order to receive an event generated in the controlled device. This event registration request may be performed in response to an input from a user using the controlling device or may be automatically performed when the controlling device starts operating.

In operation S120, the controlled device responds to the event registration request. In operation S130, the controlled device transmits an initial event message including information on its current status to the controlling device.

Thereafter, when an event indicating the status change of the controlled device is generated in operation S140, the controlled device transmits an event message including information on the generated event to the controlling device in operation S150. Here, when a plurality of events are generated at the same time, the controlled device may embed information on all of the events into a single event message and transmit the single event message to the controlling device.

Accordingly, the controlling device interprets the event message and provides the information on the event(s) generated in the controlled device.

However, in this conventional procedure, the controlling device must request the controlled device to perform the event registration in order to obtain information on an event generated in the controlled device.

Accordingly, in a state where the event registration request is not performed, the controlling device cannot receive event information from the controlled device. In this condition, problems may occur when an emergency event is generated. For example, when gas leakage is sensed by a gas leakage detection system corresponding to the controlled device located on a first floor while a user having a personal digital assistant (PDA) corresponding to the controlling device is watching television on a second floor without the event registration from the gas leakage detection system, the PDA cannot acquire information on the gas leakage, and therefore, the user cannot be informed of the danger state of the gas leakage.

SUMMARY OF THE INVENTION

Aspects of the present invention provide a method and apparatus for collecting event information generated in a device having an event like a controlled device without performing event registration and providing the event information to a user, thereby allowing the event information to be shared efficiently.

The above and other aspects of the present invention will be described in or be apparent from the following description of the exemplary embodiments.

According to an aspect of the present invention, there is provided an apparatus for providing event information. The apparatus includes an event sensing module receiving first event information on an event generated in an event generator in a multicast mode, a control module receiving second event information including detailed information on the generated event using the first event information, and a user interface module providing the second event information to a user.

According to another aspect of the present invention, there is provided a method of providing event information, including receiving first event information on an event generated in an event generator in a multicast mode, receiving second event information including detailed information on the generated event using the first event information, and providing the second event information to a user.

According to still another aspect of the present invention, there is provided a system for providing event information, including an event generator generating an event, and an event receiver receiving first event information on the generated event in a multicast mode, receiving second event information including detailed information on the generated event using the first event information, and providing the second event information to a user.

BRIEF DESCRIPTION OF THE DRAWINGS

The above and other features and aspects of the present invention will become more apparent by describing in detail exemplary embodiments thereof with reference to the attached drawings in which:

FIG. 5 illustrates an event log information table according to an exemplary embodiment of the present invention;

FIG. 7 illustrates the format of event information according to an exemplary embodiment of the present invention.

DETAILED DESCRIPTION OF THE INVENTION

Figure 1:
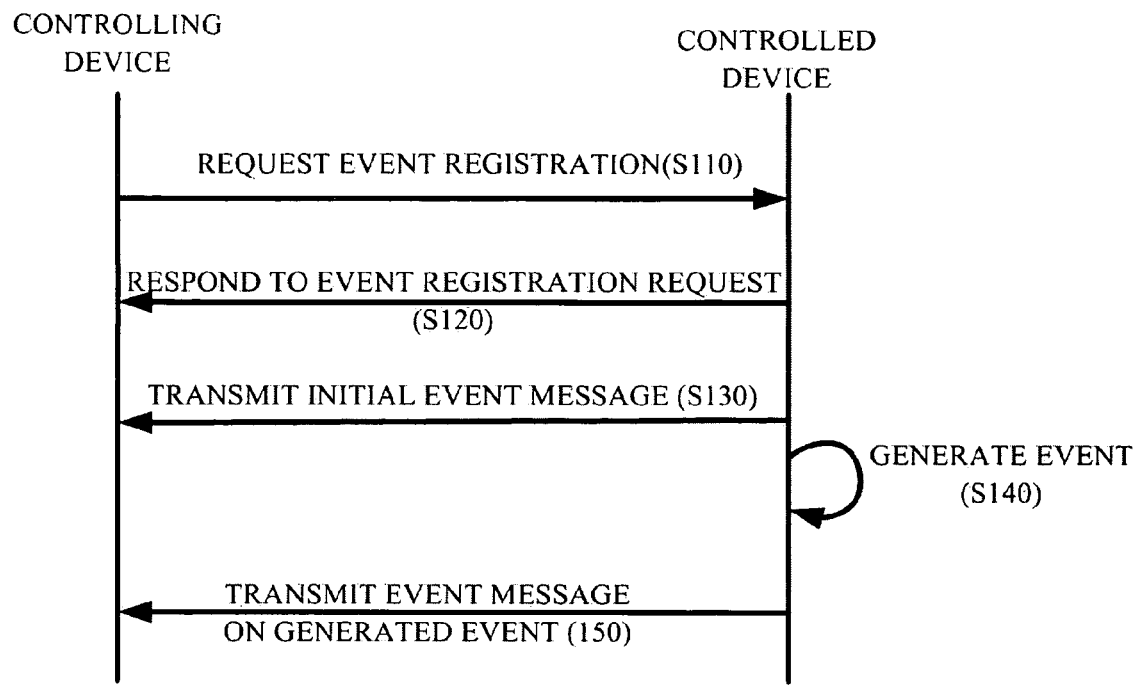
FIG. 1 is a flowchart of the procedure of providing event information using related art technology.

The aspects and features of the present invention and methods of accomplishing the same may be understood more readily by reference to the following detailed description of exemplary embodiments and the accompanying drawings. The present invention may, however, be embodied in many different forms and should not be construed as being limited to the exemplary embodiments set forth herein. Rather, these embodiments are provided so that this disclosure will be thorough and complete and will fully convey the concept of the invention to those skilled in the art, and the present invention will only be defined by the appended claims. In the drawings, the thickness of layers and regions are exaggerated for clarity.

The aspects and features of the present invention are described hereinafter with reference to flowchart illustrations of user interfaces, methods, and computer program products according to exemplary embodiments of the present invention. It will be understood that each block of the flowchart illustrations, and combinations of blocks in the flowchart illustrations, can be implemented by computer program instructions. These computer program instructions can be provided to a processor of a general purpose computer, special purpose computer, or other programmable data processing apparatus to produce a machine, such that the instructions, which execute via the processor of the computer or other programmable data processing apparatus, create means for implementing the functions specified in the flowchart block or blocks.

These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks.

The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Furthermore, each block of the flowchart illustrations may represent a module, segment, or portion of code, which comprises one or more executable instructions for implementing the specified logical function(s). It should also be noted that in some alternative implementations, the functions noted in the blocks may occur out of the order. For example, two blocks shown in succession may in fact be executed substantially concurrently or the blocks may sometimes be executed in the reverse order, depending upon the functionality involved.

In the present specification, the term "event" includes a status change generated in a device included in a home network. For example, the event may be starting or terminating recording of a program in a set-top box, stopping a digital versatile disc (DVD) player, or sensing gas leakage in a gas leakage detection system. Various events may be generated according to types of devices. In addition, the event may indicate an update of information generated in an inside or outside of the home network.

The term "event information" includes information on an event such as identification information on a device generating the event, time at which the event is started, content of the event, and universal resource locator "URL" information related to the event. In addition, the event information may include information received from an external server located outside the home network.

Figure 2:
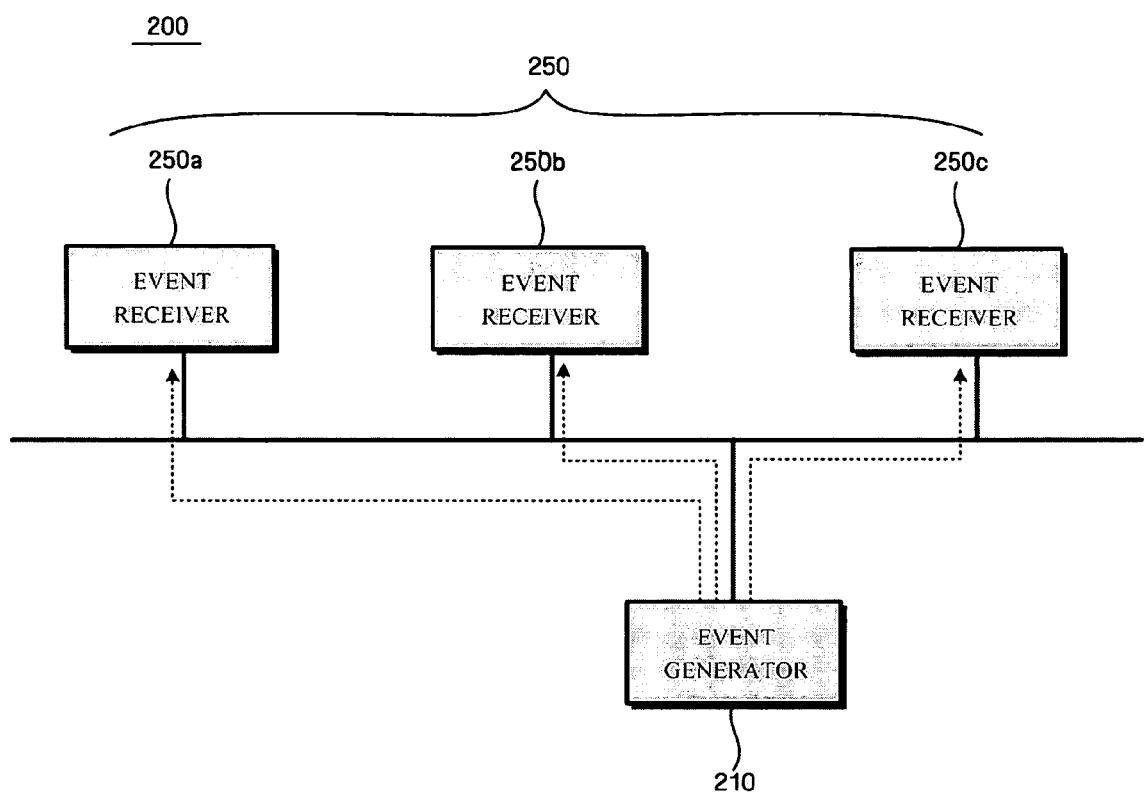
FIG. 2 is a block diagram of a system for providing event information according to an exemplary embodiment of the present invention.

FIG. 2 is a block diagram of a system 200 for providing event information according to an exemplary embodiment of the present invention. The system 200 includes a plurality of event receivers 250a, 250b, and 250c, which comprise an event receiver unit 250. The system 200 illustrated in FIG. 2 includes, for brevity, a single event generator 210 but may include a plurality of event generators in other embodiments of the present invention.

The event generator 210 is connected to the plurality of the event receivers 250a, 250b, and 250c via a wired network (includes, for example, optical networks), a wireless network, a combination of them, or the like.

Each of the event receivers 250a, 250b, and 250c corresponds to a controlling device and the event generator 210 corresponds to a controlled device on a Universal Plug and Play (UPnP) home network. Here, the event generator 210 may function as a gateway in the home network. In this case, the event generator 210 can access a server located outside the home network, such as through the Internet.

The event generator 210 is controlled by the event receivers 250a, 250b, and 250c (hereinafter, referred to as an event receiver unit 250). The event generator 210 transmits event information to the event receiver unit 250 according to the control by the event receiver unit 250 or automatically. Here, the event information is transmitted in a multicast mode. For this operation, addresses for multicast are allocated to the event generator 210 and the event receiver unit 250 in advance. In a case where the event generator 210 is connected as a gateway of the home network to an external server (not shown) via the Internet, when information such as stock information or weather information is updated in the external server, the updated information may be provided as event information to the event generator 210.

The operation of the system 200 illustrated in FIG. 2 will be described in detail below.

When an event is generated in the event generator 210, the event generator 210 transmits an event message including event information on the generated event to the event receiver unit 250. Here, the event message is transmitted in the multicast mode.

The event receiver unit 250 extracts the event information from the event message and informs a user of the generated event based on the extracted event information.

If the event information is resource location information, for example, URL information, the event receiver unit 250 accesses the URL information and provides related event information to the user. If the URL information includes a plurality of URLs, the event receiver unit 250 provides the URL information and accesses a URL selected by the user.

The URL information may indicate a URL of the event generator 210 or another device located inside or outside the home network.

The event receiver unit 250 may provide the event information received from the event generator 210 or obtained by accessing a URL corresponding to the URL information to the user by displaying the event information or outputting it in sound.

If the event generator 210 is connected to an external server through the Internet, the event generator 210 may receive updated information from the external server and transmit it as the event information to the event receiver unit 250.

Figure 3:
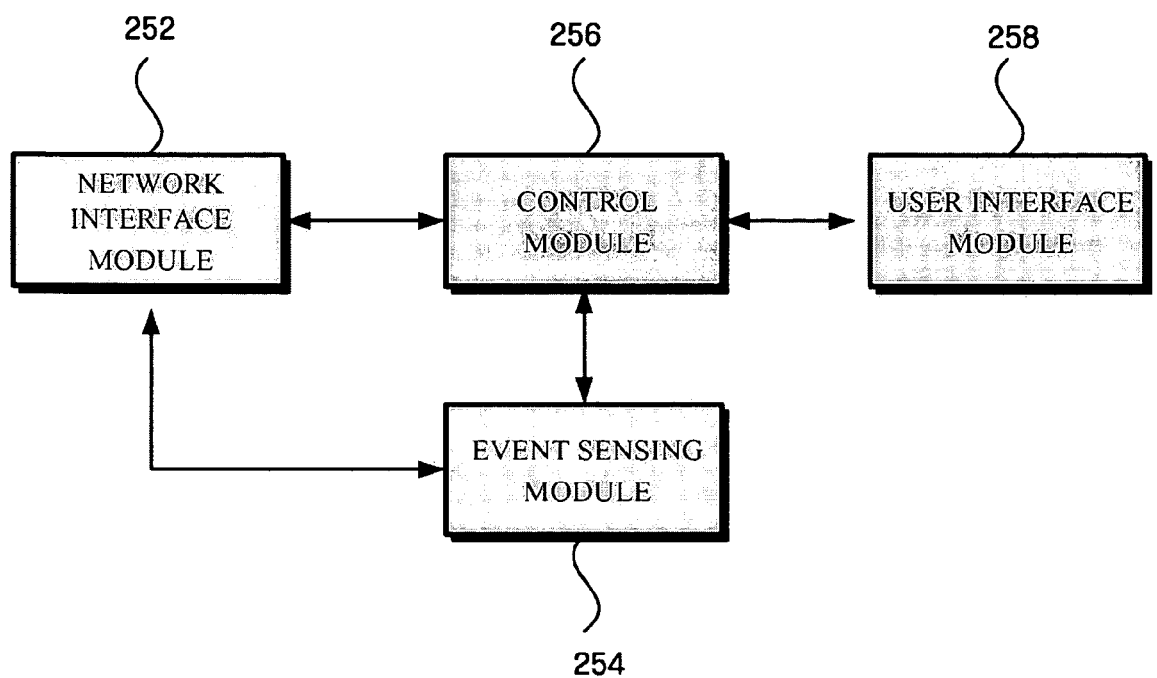
FIG. 3 is a block diagram of an event receiver illustrated in FIG. 2.

FIG. 3 is a block diagram of the event receiver 250a illustrated in FIG. 2.

Referring to FIG. 3, the event receiver 250a includes a network interface module 252, an event sensing module 254, a control module 256, and a user interface module 258.

The network interface module 252 communicates with the event generator 210 via a wired or wireless connection according to a communication medium. In addition, the network interface module 252 may allow the access to the Internet.

The event sensing module 254 senses event information among information received through the network interface module 252 and transmits the event information to the control module 256.

The control module 256 interprets event information received from the event sensing module 254 or receives the event information by accessing the event generator 210 or a device storing detailed information on a generated event and transmits the event information to the user interface module 258.

In addition, the control module 256 may generate a control message for controlling the event generator 210 and transmit it to the event generator 210 via the network interface module 252. The event sensing module 254 and the control module 256 may operate together as a single module. Alternatively, the network interface module 252 may include the event sensing module 254.

The user interface module 258 provides event information received from the control module 256 to a user and receives a control command for controlling the event generator 210 from the user.

The term "module", as used herein, includes, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to execute on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules.

The operation of each module illustrated in FIG. 3 will be described in detail with reference to the flowchart illustrated in FIG. 4.

If an event indicating a status change, e.g., stopping the operation of a DVD player, or gas leakage, is generated in the event generator 210 in operation S410, the event generator 210 transmits an event message including event information on the generated event to the event receiver 250a in a multicast mode in operation S420. In the current exemplary embodiment of the present invention, the event information transmitted in the multicast mode is referred to as first event information.

The first event information may include a parameter indicating the status change of the event generator 210 and a parameter value and may be transmitted in a frame format or a structured text format like extensible markup language "XML". In addition, the first event information may include resource location information such as URL information allowing detailed information on the generated event to be obtained. The event message including the first event information may include multicast internet protocol "IP" address and port information for multicast transmission, information on an event type, and identification information of the event generator 210.

Examples of the event type are "Info" giving information, "Fault" reporting an erroneous or fault situation, "Warning" reporting an alert situation, and "Emergency" reporting an urgent situation.

The event sensing module 254 included in the event receiver 250a senses from the event message received through the network interface module 252 that an event has been generated. The event sensing module 254 can sense whether an event has been generated by monitoring whether a message is received through an address and a port which have been predetermined for multicast communication.

The event sensing module 254 extracts the first event information from the event message and transmits the first event information to the control module 256. The control module 256 displays the first event information through the user interface module 258 in operation S430.

If the first event information is the resource location information such as a URL, the control module 256 accesses the URL through the network interface module 252 in operation S440 and receives detailed information on the generated event from the URL in operation S450. In the exemplary embodiments of the present invention, the detailed information received from the URL is referred to as second event information. If the resource location information corresponding to the first event information includes two or more resources, the plurality of resources are displayed through the user interface module 258 in operation S430 to allow a user to select a resource. When the user selects one resource, the second event information is transmitted from the resource to the event receiver 250a.

The control module 256 transmits the second event information to the user interface module 258. The user interface module 258 displays the second event information to the user in operation S460.

Meanwhile, the event receiver 250a may store event information for a predetermined period of time or selectively store event information. In this case, the event receiver 250a may generate an event log information table including many items of event information in a separate storage area. FIG. 5 illustrates an example of the event log information table.

Referring to FIG. 5, an event log information table 500 may include a time when an event is generation, a type of an event generator (i.e., device identification), an event type, a URL of the event generator, or various other types of information related to events.

Log information included in the event log information table 500 may be sorted, searched, or filtered by the control module 256 or the user interface module 258. A sorting, searching or filtering result may be provided to a user through the user interface module 258. In other words, the event receiver 250a can sort event log information by event generators, event types, or event generation times when providing it to the user and can also allow the user to search event information.

Figure 4:
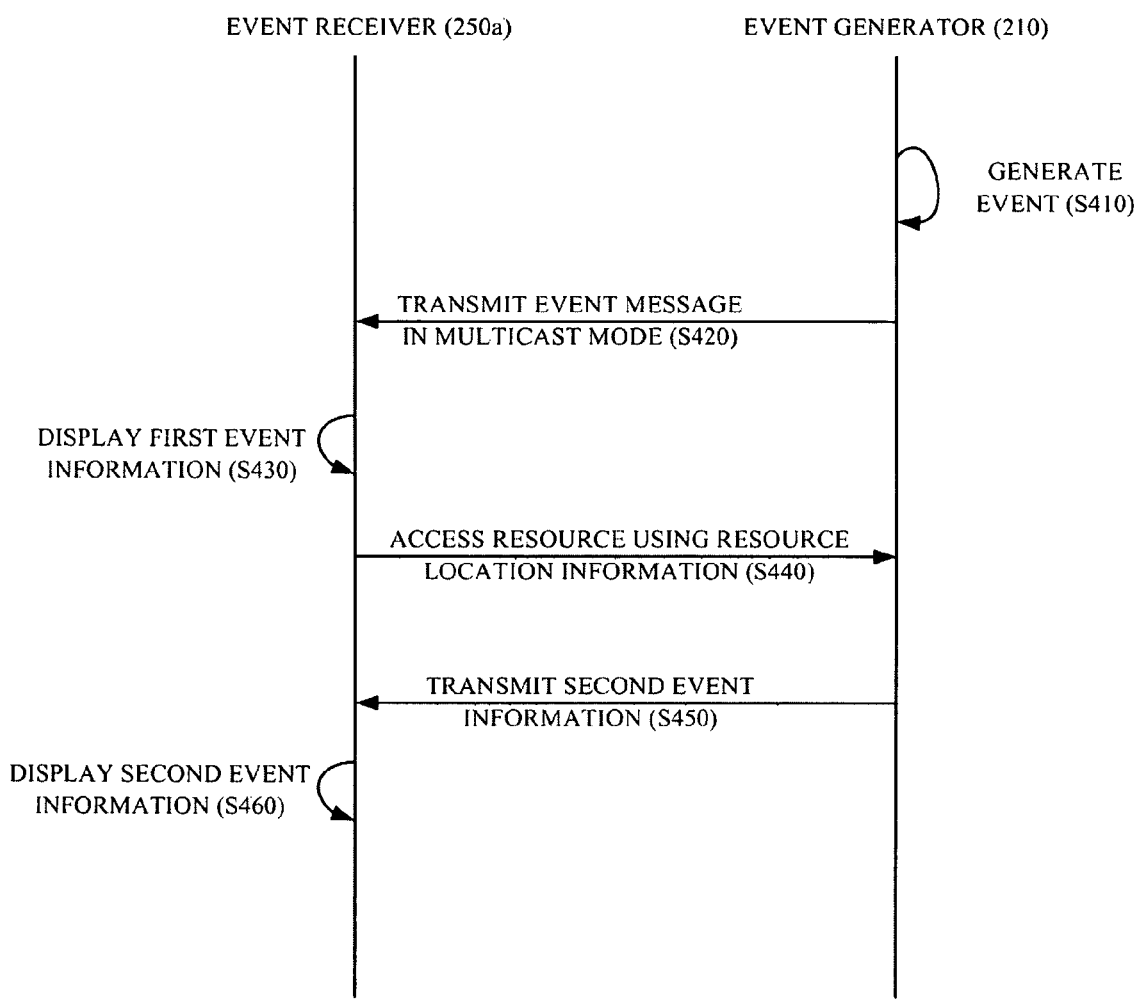
FIG. 4 is a flowchart of a method of providing event information according to an exemplary embodiment of the present invention.

Meanwhile, FIG. 4 illustrates that when the first event information is the resource location information, e.g., URL information, the URL information refers to the event generator 210. However, this is just an example. The URL information may indicate a resource other than the event generator 210, which can provide more detailed information on an event generated in the event generator 210.

Figure 6:
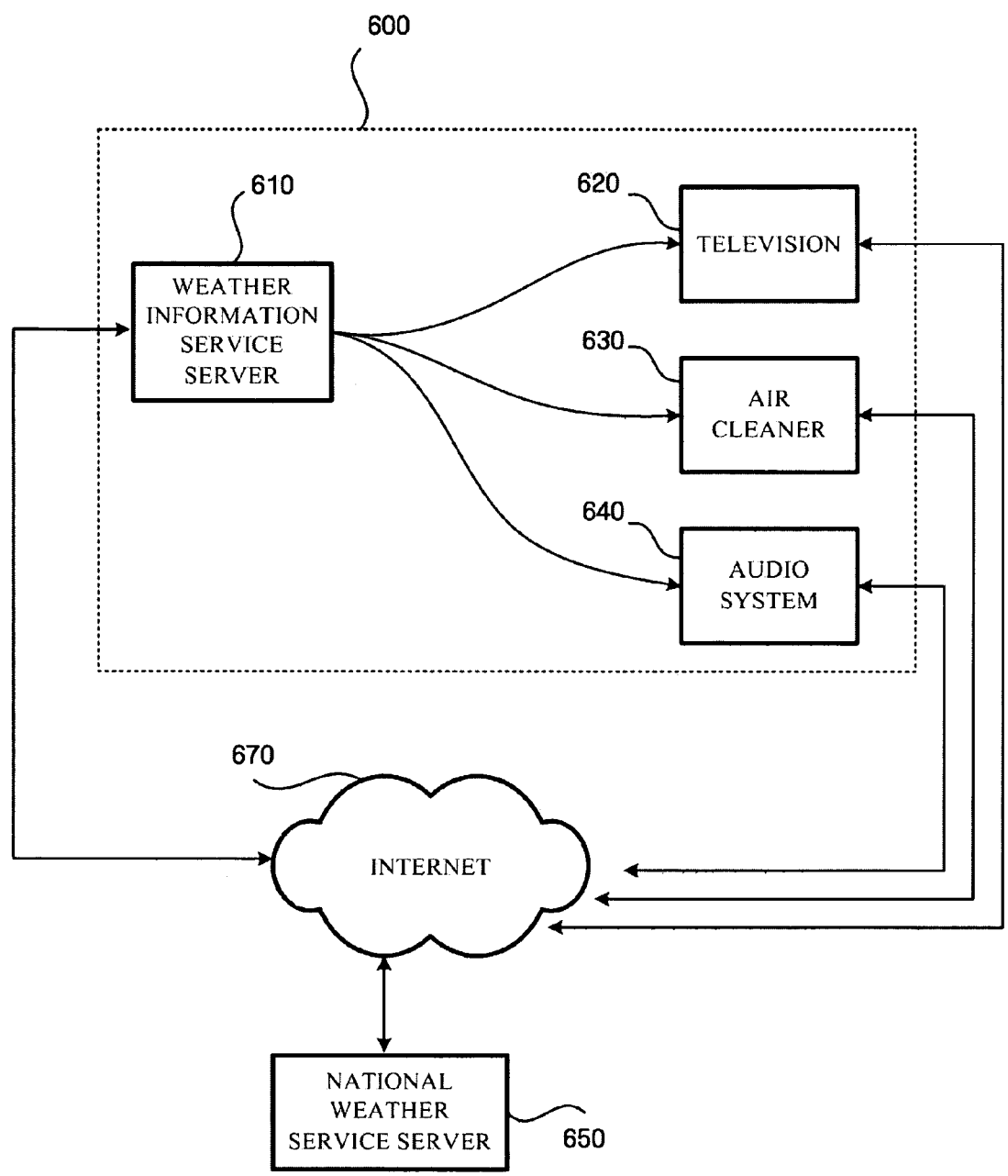
FIG. 6 is a block diagram of a system for providing event information according to another exemplary embodiment of the present invention.

FIG. 6 is a block diagram of a system for providing event information according to another exemplary embodiment of the present invention.

Referring to FIG. 6, a home network 600 includes a weather information service server 610 and devices such as a television 620, an air cleaner 630, and an audio system 640. The weather information service server 610 functions as a gateway of the home network 600. The elements of the home network 600 can access a national weather service server 650 having a URL of "weather.gov" through Internet 670.

The weather information service server 610 corresponds to the event generator 210 illustrated in FIG. 2. The television 620, the air cleaner 630, and the audio system 640 correspond to the event receivers 250a, 250b, and 250c, respectively, illustrated in FIG. 2.

When a thick cloud of yellow dust is coming, the national weather service server 650 announces a yellow dust alert and transmits it to the weather information service server 610 through the Internet 670. The weather information service server 610 transmits event information indicating that the yellow dust alert has been announced to devices included in the home network 600 in a multicast mode. Here, the event information may have a format illustrated in FIG. 7.

When a device included in the home network 600, for example, the television 620, receives the event information illustrated in FIG. 7, the television 620 identifies the event information as "Warning" based on "/event/warning", accesses "http://weather.gov/yd.html" specified in <YellowDustHTMLData>, receives detailed information, and provides a hyper text markup language "HTML" document about the "Warning" to a user based on the received detailed information. In FIG. 7, "239.255.255.250:1901" is an address and port number for multicast.

Since the air cleaner 630 can determine an air cleaning level only when being informed of a level of yellow dust, the air cleaner 630 accesses "http://weather.gov/yd.xml" specified in <YellowDustXMLData> and receives XML data including detailed information indicating the level of yellow dust. Thereafter, the air cleaner 630 determines the air cleaning level based on the received detailed information and automatically starts air cleaning according to the determined air cleaning level.

Meanwhile, the audio system 640 accesses "http://weather.gov" specified in <YellowDustAudioData> and receives a "yd.mp3" file. Thereafter, the audio system 640 plays the "yd.mp3" file and outputs a message "Clouds of yellow dust is coming" in sound.

According to the present invention, in a UPnP home network, information on an event generated in an event generator can be provided to a user without an event registration procedure.

While the present invention has been particularly shown and described with reference to exemplary embodiments thereof, it will be understood by those of ordinary skill in the art that various changes in form and details may be made therein without departing from the spirit and scope of the present invention as defined by the following claims. Therefore, it is to be understood that the above-described embodiments have been provided only in a descriptive sense and will not be construed as placing any limitation on the scope of the invention.

What is claimed is:

1. An event receiver for providing event information, comprising:
   a processor which comprises:
      an event sensing module which receives first event information on an event generated by a transmitter, through a network, without an event registration procedure, wherein the generated event comprises a status change of the transmitter;
      a control module processor which generates a first message based on the first event information and transmits the first message to the transmitter, receives second event information including detailed information on the generated event using the first event information and generates a second message based on the second event information and transmits the second message to the transmitter; and
      a user interface module which provides the second event information to a user via an audio output or a display,
   wherein the first event information comprises address and port information for transmission, and universal resource locator (URL) information indicating a location of the detailed information on the generated event.

2. The event receiver of claim 1, wherein the detailed information on the generated event comprises an update of information.

3. The event receiver of claim 1, wherein the first event information comprises address and port information for multicast transmission.

4. The event receiver of claim 1, wherein first event information comprises information on a type of the generated event.

5. The event receiver of claim 4, wherein the type of the generated event is a type giving information, a type reporting an erroneous or fault situation, a type reporting an alert situation, or a type reporting an urgent situation.

6. A method of providing event information, comprising:
   receiving, through a network, first event information on an event generated by a transmitter without an event registration procedure, wherein the generated event comprises a status change of the transmitter;
   a control module processor, which is comprised in an event receiver, generating a first message based on the first event information, transmitting the first message to the transmitter, receiving second event information including detailed information on the generated event using the first event information, and generating a second message based on the second event information, and transmitting the second message to the transmitter; and
   providing the second event information to a user via one of an audio output and a display, wherein the first event information comprises address and port information for transmission, and universal resource locator (URL) information indicating a location of the detailed information on the generated event.

7. The method of claim 6, wherein the detailed information on the generated event comprises an update of information.

8. The method of claim 6, wherein the first event information comprises address and port information for multicast transmission.

9. The method of claim 6, wherein first event information comprises information on a type of the generated event.

10. The method of claim 9, wherein the type of the generated event is a type giving information, a type reporting an erroneous or fault situation, a type reporting an alert situation, or a type reporting an urgent situation.

11. A system for providing event information, comprising:
an event transmitter which generates an event, wherein the generated event comprises a status change of the event transmitter; and
an event receiver which:
receives, through a network, first event information on the event without an event registration procedure,
generates a first message based on the first event information and transmits the first message to the event transmitter,
receives second event information including detailed information on the event using the first event information,
generates a second message based on the second event information and transmits the second message to the event transmitter, and
provides the second event information to a user,
wherein the first event information comprises address and port information for transmission, and universal resource locator (URL) information indicating a location of the detailed information on the event.

12. The system of claim 11, wherein the detailed information on the generated event comprises an update of information.

13. The system of claim 11, wherein the first event information comprises address and port information for multicast transmission.

14. The system of claim 11, wherein the first event information comprises information on a type of the event.

15. The system of claim 14, wherein the type of the event is a type giving information, a type reporting an erroneous or fault situation, a type reporting an alert situation, or a type reporting an urgent situation.

16. The system of claim 11, wherein the event receiver accesses the URL to receive the second event information on the event.

17. The system of claim 11, wherein the event receiver generates a message for the event transmitter based on the first event information and transmits the message to the event transmitter.

18. The system of claim 11, wherein the event receiver generates a message for the event transmitter based on the second event information and transmits the message to the event transmitter.

19. The system of claim 11, wherein the event receiver generates a message for the event transmitter based on the second event information and executes the message.

20. A method of providing event information, comprising:
receiving, through a network, first event information on an event generated by a transmitter without an event registration procedure, wherein the generated event comprises a status change of the transmitter;
a control module processor, which is comprised in an event receiver, generating a first message based on the first event information and transmitting the first message to the transmitter, receiving second event information including detailed information on the generated event using the first event information, and generating a second message based on the second event information and transmitting the second message to the transmitter;
wherein the first event information comprises address and port information for transmission, and universal resource locator (URL) information indicating a location of the detailed information on the event.

* * * * *